United States Patent
Ahner et al.

(10) Patent No.: US 7,026,676 B2
(45) Date of Patent: Apr. 11, 2006

(54) MEMORY ARRAY HAVING A LAYER WITH ELECTRICAL CONDUCTIVITY ANISOTROPY

(75) Inventors: Joachim Walter Ahner, Pittsburgh, PA (US); Jun Yu, Pittsburgh, PA (US); Dieter Klaus Weller, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/879,670

(22) Filed: Jun. 29, 2004

(65) Prior Publication Data

US 2005/0285169 A1      Dec. 29, 2005

(51) Int. Cl.
*H01L 29/76*      (2006.01)
(52) U.S. Cl. ............... 257/295; 257/532; 257/296; 257/255; 257/301; 257/623; 365/151; 365/117
(58) Field of Classification Search ............. 275/532, 275/295, 296, 255, 301, 623; 365/151, 117
See application file for complete search history.

(56) References Cited

U.S. PATENT DOCUMENTS

| 6,111,284 | A | 8/2000 | Sakurai | 257/310 |
|---|---|---|---|---|
| 6,284,654 | B1 | 9/2001 | Roeder et al. | 438/681 |
| 6,728,093 | B1 | 4/2004 | Fox | 361/303 |
| 2003/0008418 | A1 | 1/2003 | Eason et al. | 438/3 |
| 2003/0047764 | A1 | 3/2003 | Joo | 257/295 |
| 2003/0157734 | A1 | 8/2003 | Engelhardt et al. | 438/3 |
| 2003/0201475 | A1 | 10/2003 | Uchiyama et al. | 257/295 |
| 2004/0016952 | A1 | 1/2004 | Sawasaki | 257/310 |
| 2004/0071924 | A1 | 4/2004 | Yang et al. | 428/65.3 |

OTHER PUBLICATIONS

"The Millipede-Nanotechnology Entering Data Storage," *IEEE Transactions on Nanotechnology*, vol. 1, No. 1, Mar. 2002; pp. 39-55.
"A Survey of Circuit Innovations in Ferroelectric Randon-Access Memories," *Proceedings of the IEEE*, vol. 88, No. 5, May 2000; pp. 667-689.

*Primary Examiner*—David Nelms
*Assistant Examiner*—Tram H. Nguyen
(74) *Attorney, Agent, or Firm*—Westman, Champlin & Kelly (57) ABSTRACT

A memory array includes a memory layer that has hysteretic domains with domain axes extending between first and second memory layer surfaces. A conductive layer on the first memory layer surface has anisotropically increased electrical conductivity in a thickness direction. A movable conductive probe has a contact area on the conductive layer and moves to access a selected hysteretic domain.

19 Claims, 6 Drawing Sheets

MEMORY ARRAY HAVING A LAYER WITH ELECTRICAL CONDUCTIVITY ANISOTROPY

FIELD OF THE INVENTION

The present invention relates generally to electrical hysteretic technology memories, and more particularly, but not by limitation, to electrically hysteretic memories such as ferroelectric random access memories (FeRAM) and phase change memories.

BACKGROUND OF THE INVENTION

Ferroelectric random access memories (FeRAM) are typically arranged in rectangular arrays of ferroelectric cells with multilayered masked structures that delineate the cells, and row and column metallizations separated by insulating layers for addressing individual cells. The masked structures typically also include masked structures defining transistors for controlling current flow to individual cells.

The masked structures are complex and expensive, and the resolution limits of the masking technology sets an undesirable low areal bit density limit on FeRAM data storage. There is a need to provide electrical hysteresis methods and devices that are not limited by use of masking technologies to define individual electrical hysteretic cells.

Embodiments of the present invention provide solutions to these and other problems, and offer other advantages over the prior art.

SUMMARY OF THE INVENTION

Disclosed are a memory array and a method for making a memory array. In one embodiment, the memory array comprises a memory layer. The memory layer includes hysteretic domains with domain axes extending between first and second memory layer surfaces. The memory array also comprises a conductive layer on the first memory layer surface. The conductive layer has anisotropically increased electrical conductivity in a thickness direction. The memory array further comprises a conductive probe having a contact area on the conductive layer. The conductive probe is movable to access a selected hysteretic domain.

In one arrangement, the memory layer comprises polarizable ferroelectric material and the anisotropic conductive layer comprises a material compatible with the ferroelectric material. In preferred arrangements, the anisotropic conductive layer comprises strontium oxide (SrO) or platinum metal clusters separated by grain boundaries that form a matrix of lower conductivity around the higher conductivity metal clusters. The grain boundaries define islets and separate domains can be accessed in the memory array without the use of masking to define domains.

In another arrangement, the memory layer comprises phase changeable chalcogenic material and the anisotropic conductive layer comprises a material compatible with the chalcogenic material. In preferred arrangements, the chalcogenic material comprises an alloy of silver, indium, antimony and tellurium.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, a memory array includes a memory layer of hysteretic material that is covered with a conductive layer that is electrically anisotropic. The conductive layer includes higher conductivity islets that are separated from one another by a lower conductivity matrix. The islets are formed and defined inherently by the molecular characteristics of a deposition process used for the conductive layer. There is no need to provide any masking steps in order to define either the islets or individual memory domains. The individual memory domains are defined by an area swept by a trailing edge of a moving contact probe during a write pulse. Individual islets of hysteretic material can be written to and read electrically. The hysteretic material can comprise electrically polarizable material such as PZT film. Alternatively, the hysteretic material can comprise a phase change material, such as a chalcogenic material, that can change phase from crystalline to amorphous by heating from an electric current.

Figure 1:
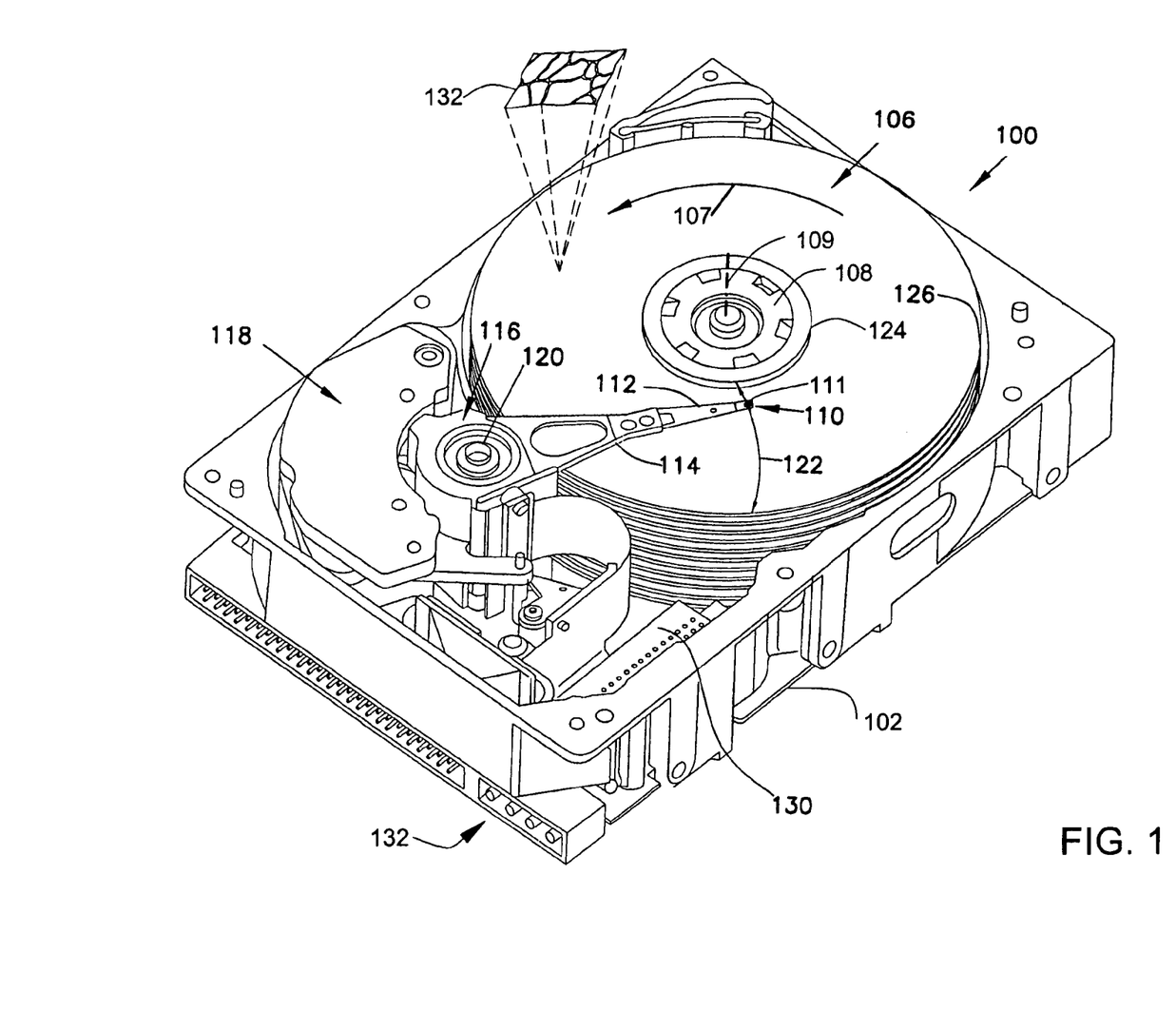
FIG. 1 illustrates an oblique view of an electrical hysteretic technology disc drive.

FIG. 1 is an oblique view of a electrical hysteretic technology disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes one or more individual discs, which are mounted for co-rotation about central axis 109. For each disc surface, there is an associated probe bases 110 which is mounted to disc drive 100 for communication with the disc surface via a conductive probe 111 that is positioned by the probe bases 110 and that contacts the disc surface. In the example shown in FIG. 1, probe bases 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached probe bases 110 about a pivot shaft 120 to position conductive probes 111 on a desired data track along an arcuate path 122 between a disc inner diameter 124 and a disc outer diameter 126. Voice coil motor 118 is driven by servo electronics 130 based on signals generated at conductive probes 111 and a host computer (not shown). The disc surface (a portion of which is illustrated in an enlarged view at 132) comprises a conductive layer with anisotropically increased electrical conductivity in a thickness direction. The disc surface is described in more detail below in connection with an example illustrated in FIG. 2.

Figure 2:
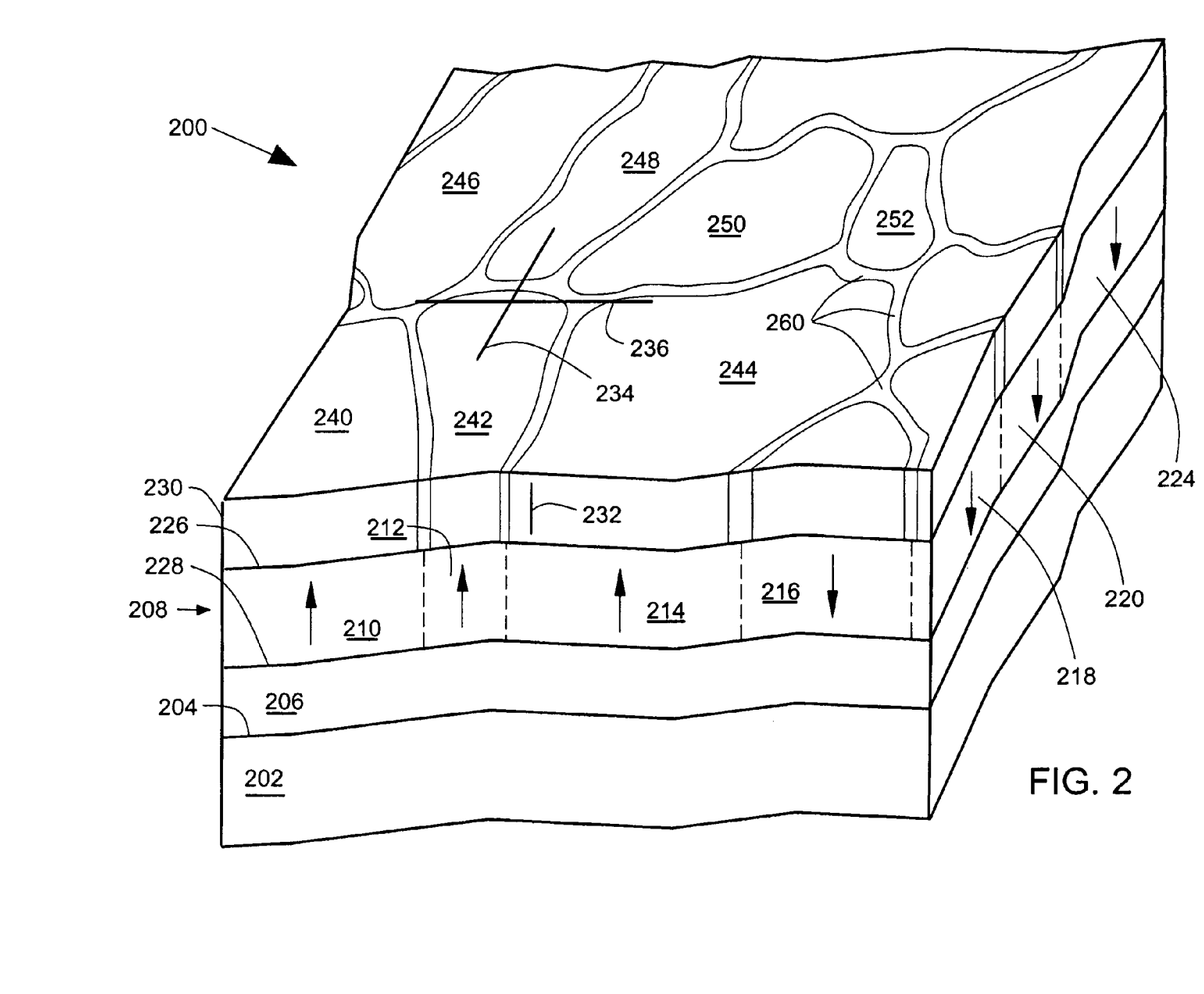
FIG. 2 illustrates a small, broken away portion of an electrical hysteretic technology disc.

FIG. 2 illustrates a small, broken away portion 200 of an electrical hysteretic technology disc for use in an electrical hysteretic technology memory, for example, the disc drive 100 illustrated in FIG. 1 or in a probe storage arrangement described below in connection with FIG. 4. The electrical hysteretic disc comprises a substrate 202 that is formed of a rigid support material such as aluminum. An upper surface 204 of the substrate 202 can be smooth and does not require texturing such as that used with magnetic storage media.

An electrically conductive base layer 206 is disposed on the upper surface 204 of the substrate 202. The base layer 206 preferably comprises (100) oriented platinum (Pt). The material of the base layer 206 can be selected to seed or initiate growth of a subsequent layer. For example, platinum can be used in base layer 206 to seed the growth of PZT in a subsequent memory layer 208.

The memory layer 208 is disposed on the base layer 206. The memory layer 208 is formed of a material that can be subjected to an electrical current or voltage to form hysteretic domains 210, 212, 214, 216, 218, 220, 224 with domain axes extending between a first (top) memory layer surface 226 and a second (bottom) memory layer surface 228.

A conductive layer 230 is disposed on the first memory layer surface 226. The conductive layer 230 has anisotropically increased electrical conductivity in a thickness direction 232 in comparison to a decreased electrical conductivity in directions 234, 236 that are parallel to the conductive layer 230. The conductivity anisotropy in the conductive layer 230 is achieved by providing higher conductivity islets (such as islets 240, 242, 244, 246, 248, 250, 252) that are electrically isolated from one another by a lower conductivity matrix 260.

The conductive layer 230 can be formed, for example, by sputtering a 2 nanometer thick platinum layer at room temperature on top of a memory layer 208 that comprises ferroelectric PZT film. The conductive layer 230 can also comprise strontium oxide (SrO). Small metallic clusters 240, 242, 244, 246, 248, 250, 252 (about 8 nanometer average diameter) are observed in a high-resolution scanning electron microscope (HRSEM) image as illustrated in FIG. 2. These clusters comprise islets that are electrically isolated from each other by a lower conductivity matrix as observed by nano-scale four point probe resistance measurements.

The memory layer 208 can also be formed of a phase change material such as the chalcogenic alloy Ag—In—Sb—Te. The phase of the chalcogenic material is locally changed from amorphous to crystalline by heating with electric current passing through a metallic cluster in the conductive layer 230. The phase change changes electrical conductivity of the chalcogenic alloy, and readback is accomplished by reading conductivity changes.

The conductive layer 230 can be formed by any process that provides a molecular structure that includes higher conductivity islets that are isolated from one another by a lower conductivity matrix. These molecular structures can include metal clusters, columnar grains, granular films, fullerenes, nanoparticles and core/shell particle structures. A number of these islets can be accessed to form a domain as described in more detail below in connection with FIGS. 3A, 3B, 4 and 5.

Figures 3A, 3B:
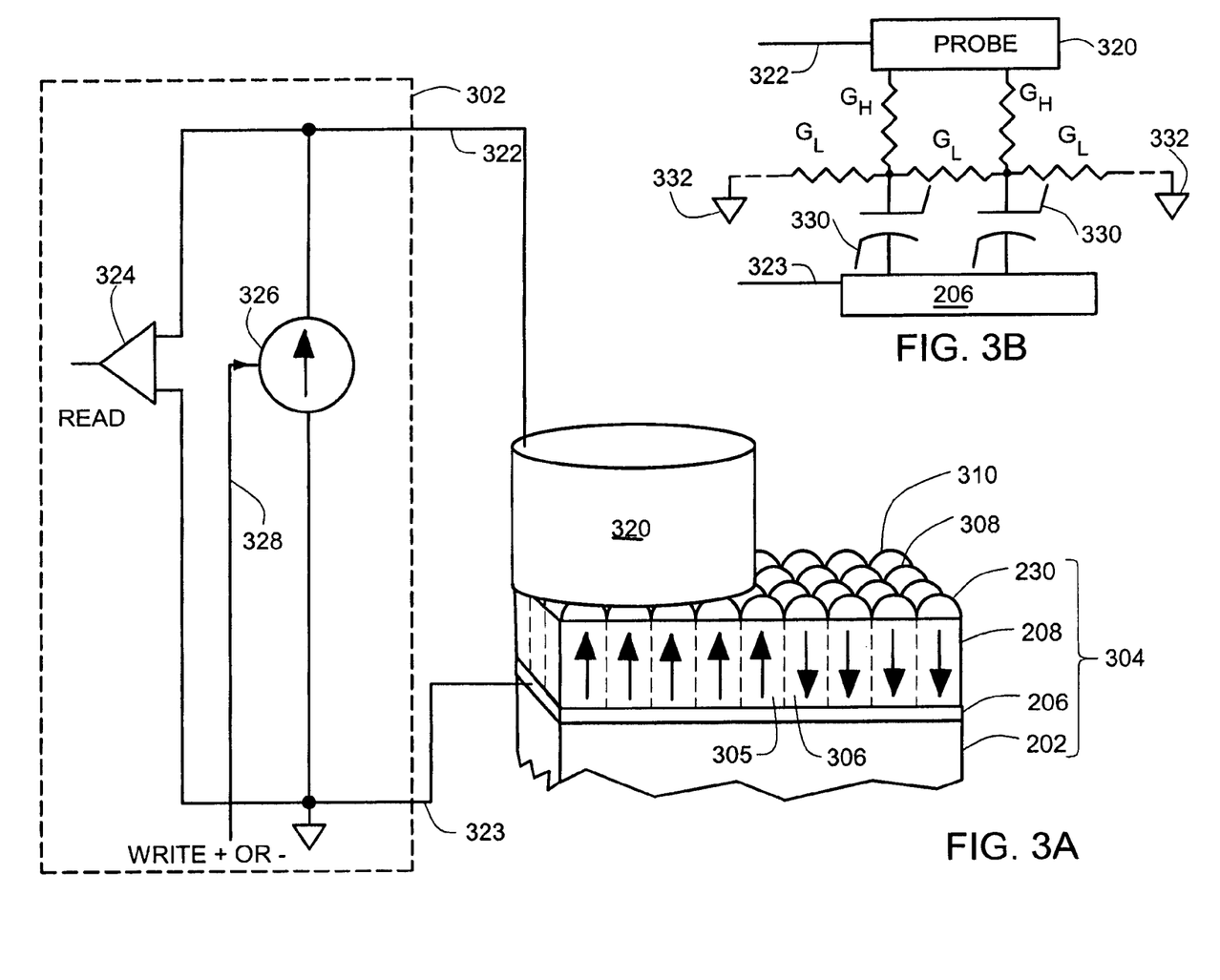
FIG. 3A schematically illustrates a memory array coupled to read/write circuitry.
FIG. 3B illustrates a first simplified equivalent circuit model of a memory array that is illustrated in FIG. 3A.

FIG. 3A schematically illustrates a memory array 300 coupled to read/write circuitry 302. The memory array 300 includes a stack 304 of memory layers that is similar to the arrangement 200 illustrated in FIG. 2. For the sake of brevity, reference numbers used in FIG. 3A that are the same as reference numbers used in FIG. 2 identify the same or similar features and are not further described in connection with FIG. 3A.

In FIG. 3A, the memory layer 208 includes hysteretic domains comprising multiple memory cells such as cells 305, 306. A conductive layer 230 in FIG. 3A is schematically illustrated to include a large number of islets such as islets 308, 310 that have a higher electrical conductivity. Each islet is partially electrically isolated from adjacent islets by a lower conductivity matrix such that there is a lower electrical conductivity in the plane of the layer 230 between islets. The arrangement of islets provides anisotropically increased electrical conductivity in a thickness direction in comparison to a decreased electrical conductivity in a plane of the layer 230 when conductivity is measured across a distance larger than an islet.

The memory array in FIG. 3A includes a conductive probe 320 that contacts the conductive layer 230 over a contact area. The contact area comprises a bottom surface of the conductive probe 320. The conductive probe 320 is movable across the conductive layer 230 to access a selected hysteretic domain (group of cells) via the conductive layer 230. A hysteretic domains generally include a portion of the memory layer 208 that is defined by multiple islets in contact with the contact area of the conductive probe 320. The probe sweeps over a group of islets during a write pulse, and the area swept by a trailing edge of the conductive probe 320 during a write pulse defines an individual domain.

The read/write circuitry 302 couples by way of a first lead 322 to the conductive probe 320. The read/write circuitry 302 couples by way of a second lead 323 to the bottom conductive layer 206. the read/write circuitry 302 comprises a read amplifier 324 that senses voltage between the conductive probe 320 and the bottom conductive layer 206. The read/write circuitry 302 also comprises a controlled current source 326 that is controlled by a write signal on a control line 328 to generate either a positive or negative write current flowing through leads 322, 323 to a selected domain in the memory layer 208. It will be understood by those skilled in the art that the read/write circuitry 302 can also be realized as a dual (not illustrated) of the one described here, and such dual realization includes a controlled voltage source that produces a write voltage and a read amplifier that is a current amplifier that senses a read current.

FIG. 3B illustrates a first simplified equivalent circuit model of the stack 304 of layers and the probe 320 that are illustrated in FIG. 3A. In the example illustrated in FIG. 3B, an example of polarizable material is shown. As illustrated in FIG. 3B, the memory layer 208 can be represented by a multiple hysteretic capacitors 330 that are connected to DC common through bottom conductive layer 206 and lead 323. Individual islets in the anisotropic conductive (top) layer 230 are represented by higher conductances $G_H$ (low resistances). A lower conductance matrix between islets is represented by lower conductances $G_L$ (higher resistances). The probe 320 connects to multiple islets. Through a large number of connections through many lower conductances $G_L$, the islets have an effective leakage path to DC common 332 for facilitating compensation after a write operation to restores the islet to an approximate zero voltage or neutral state. When ferroelectric thin films are used as memory media for high density data storage, the anisotropic electrical properties of the contact layer on top of the ferroelectric media provides the stability of the polarization as well as the write field distribution and gradient. Using the movable metallic probe 320 with an electrically anisotropic top layer avoids an undefined broadening of the write field and avoids hysteretic loss by depolarization during an idle storage time.

The permanent hysteretic property of the polarizable ferroelectric layer results in electric dipoles with bonded hysteretic charges at the uncovered ferroelectric surface. These so-called polarization charges generate an external electric field which attracts free electrical charge of opposite polarity. These free charges are attracted to the polarization charges and thereby compensate the external electric field. By covering the ferroelectric layer with a metal, these free electric charges are provided through the conduction band of the metal. This electrical compensation provided by the lower conductances between islets is roughly analogous to the demagnetizing magnetic field due to the poles of a magnet.

Figure 4:
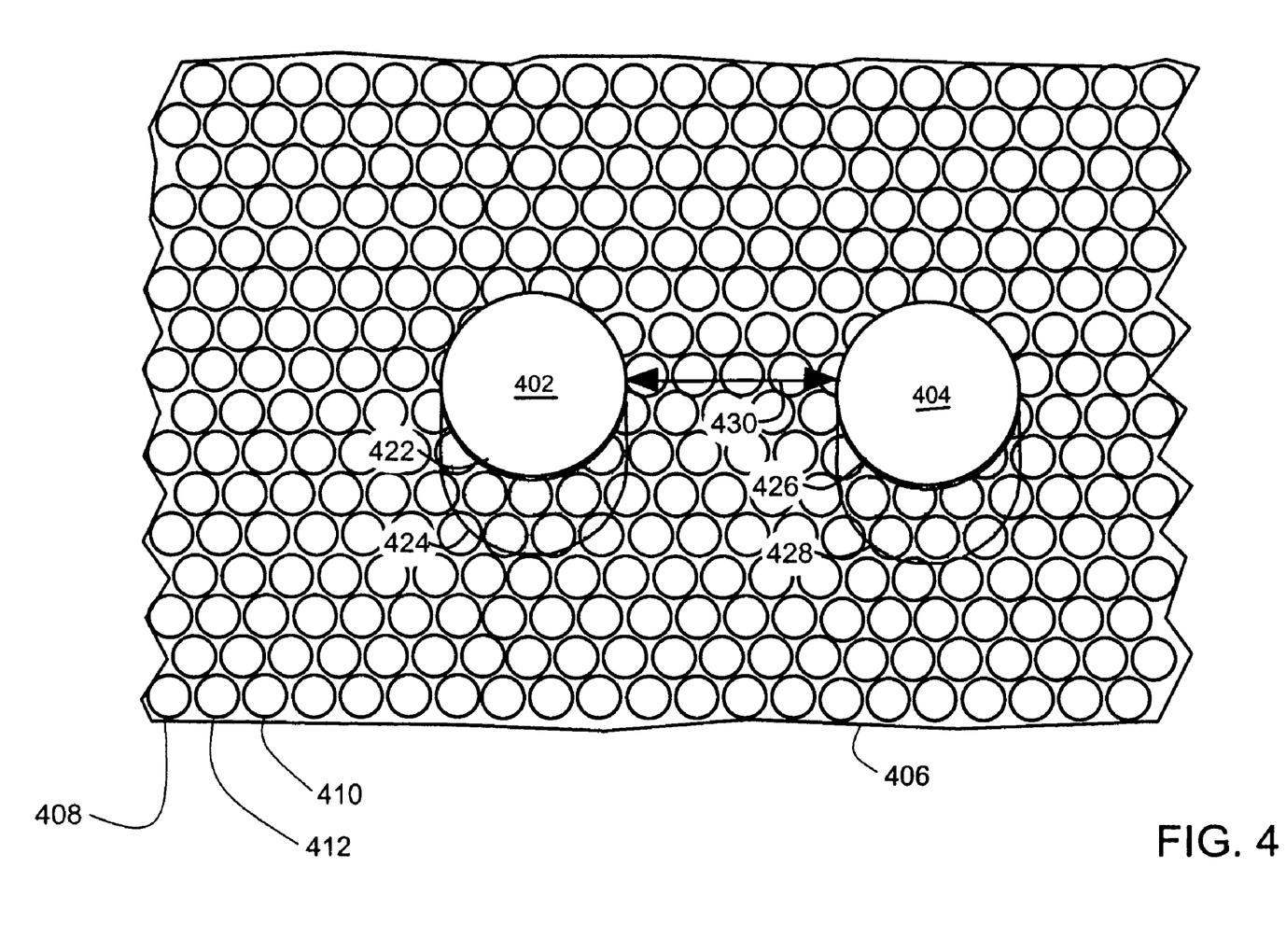
FIG. 4 illustrates a memory array that includes multiple conductive probes.

FIG. 4 illustrates a memory array 400 that includes multiple conductive probes 402, 404. The memory array 400 comprises a conductive layer 406 that includes a large number of islets such as islets 408, 410, 412 that are separated from one another by a lower conductivity matrix (not illustrated in FIG. 4). The conductive layer 406 is stacked on a memory layer, a bottom conductive layer and a substrate arranged similar to that shown at stack 304 in FIG. 3A. Each of the probes 402, 404 is movable relative to the conductive layer 406.

During a first write pulse applied to probe 402, a trailing edge 422 of the probe 402 moves over a first domain 424 (indicated by a stippled surface). During a second write pulse applied to the probe 404, a trailing edge 426 of the write probe 404 moves over a second domain 428 (indicated by a stippled surface). The probes 402 and 404 are spaced apart from one another by a separation distance 430 so that the electrical operation of probes 402, 404 do not interfere with one another. The probes 402, 404 are simple metal contacts and a large number of probes can be provided in an array to increase speed of reading and writing data, or to reduce the required stroke distance of one or more positioners that position the probes 402, 404. Probes 402, 404 can be controlled by the same positioner or by different positioners.

The size and shape of the probe influences the size and shape of the ferroelectric domain that is left in the path of a tail edge of the probe. The total domain length is defined by the speed of the slider and the electric pulse width. The fine structure of a domain is defined by the metallic cluster size and shape.

A large number of conductive probes can be arranged in an array having contact areas that are spaced apart from one another and movable together to access a plurality of selected hysteretic domains. A 64×64 array can be used, for example, providing parallel access to 4,096 bits of data at one single position of the array. In one preferred arrangement, the plurality of conductive probes are arranged in an array and the array can be moved in an oscillatory pattern to provide a probe storage arrangement. In another preferred arrangement, the plurality of conductive probes are arranged in an array on a positionable disc drive head, and the memory layer and conductive layer are arranged on a rotating disc.

Figure 5:
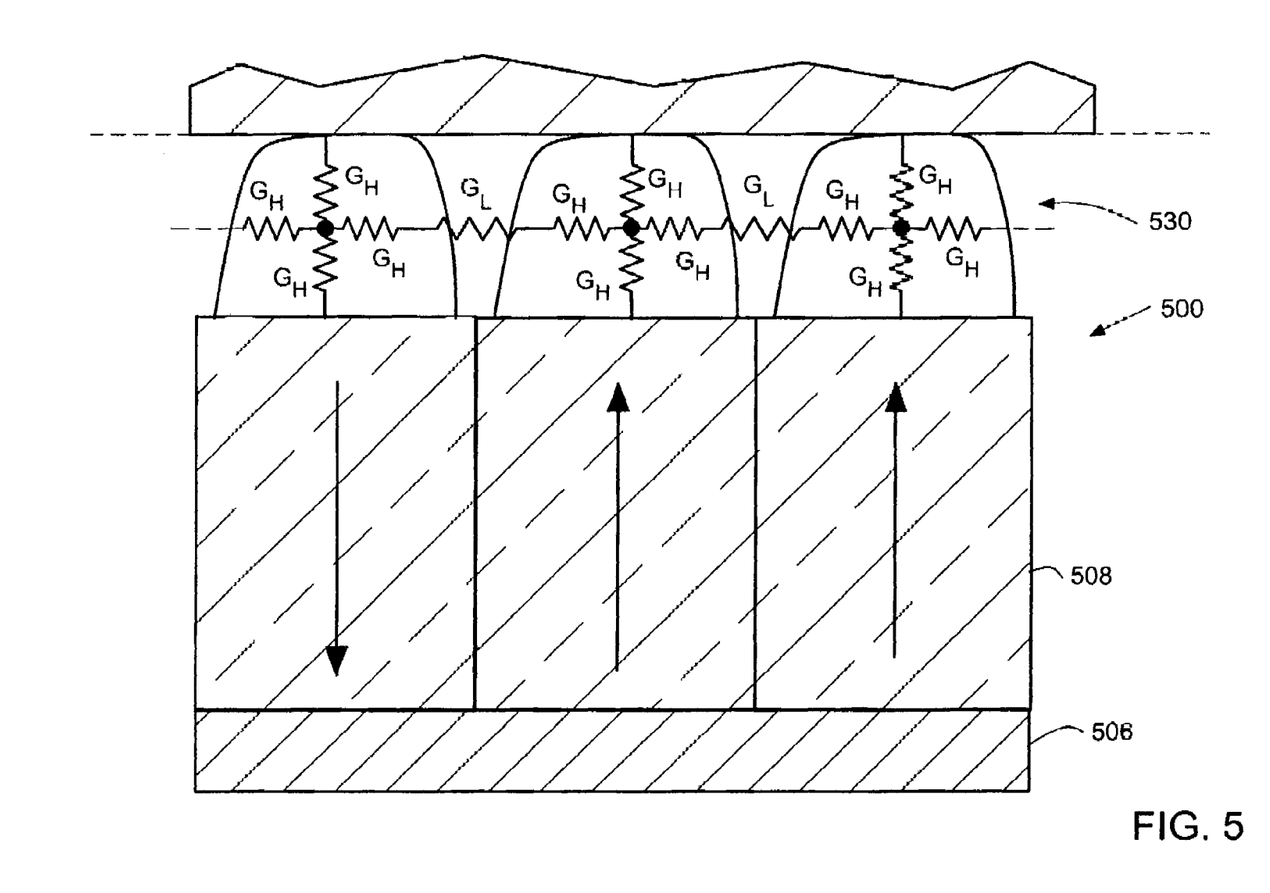
FIG. 5 illustrates an enlarged view of a memory array with a superimposed second electrical equivalent circuit.

FIG. 5 illustrates an enlarged view of a memory array 500. The memory array 500 comprises an electrically conductive (bottom) base layer 506. A memory layer 508 is disposed on the base layer 506. The memory layer 508 is formed of a material that has electrical hysteretic properties such as polarizable material or phase change material.

A conductive (top) layer 530 is disposed on the memory layer 508. The conductive layer 530 has anisotropically increased electrical conductivity in a thickness direction in comparison to a decreased electrical conductivity in the plane of the conductive layer 530. The conductive layer 530 comprises a plurality of islets such as islets 532, 534, 536. The islets 532, 534, 536 are formed of metal which has an isotropic high electrical conductivity GH in all directions. The islets 532, 534, 536 are separated from one another by a matrix of material with lower electrical conductivity GL. The matrix can comprise air, metal oxide, a grain boundary or any feature that reduces electrical conductivity relative to the islets.

Figures 6A, 6B:
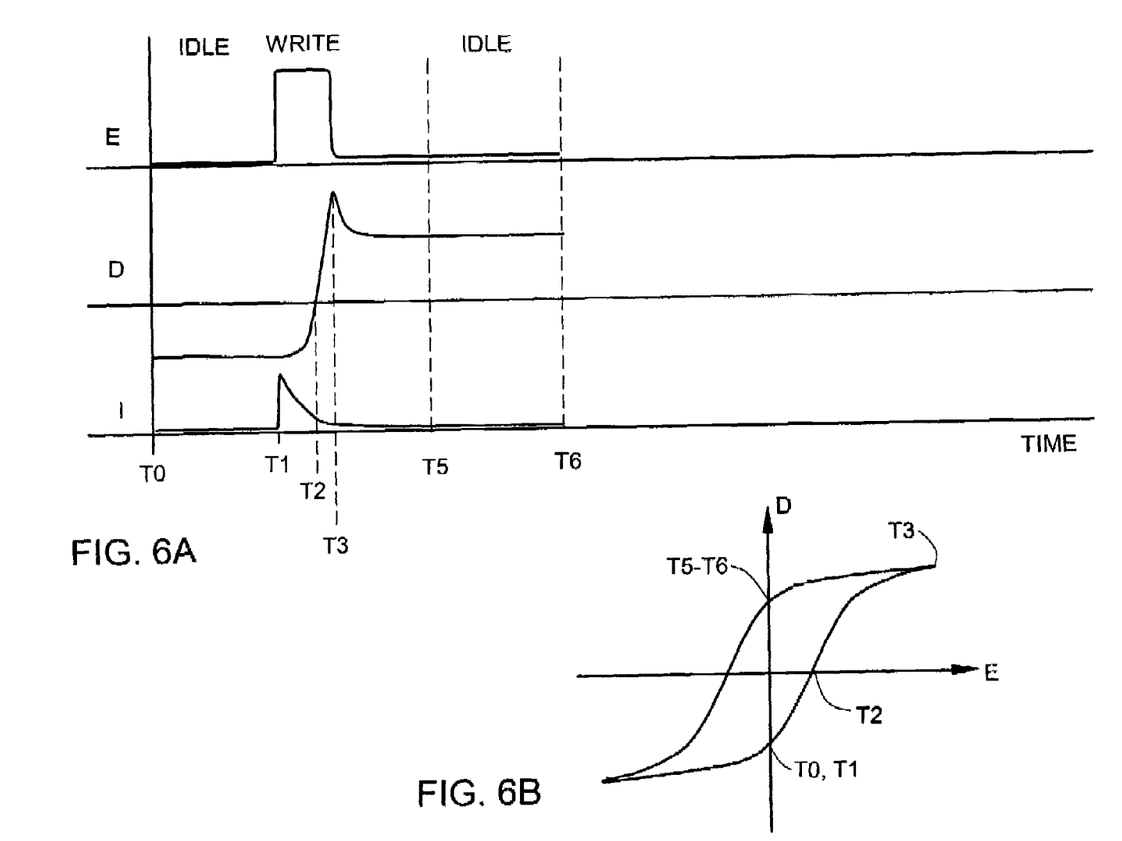
FIG. 6A illustrates a timing diagram of a write operation, an idle time and a read operation for an exemplary domain.
FIG. 6B illustrates charge displacement as a function of voltage in an exemplary domain.

FIG. 6A illustrates an exemplary timing diagram from time T0 to time T6 over a idle time, a write operation, and a second idle time for an exemplary domain in a ferroelectric memory layer such as the memory layers illustrated in FIGS. 1–5. FIG. 6B illustrates an exemplary D-E curve for charge displacement D as a function of applied voltage E for the exemplary domain illustrated in FIG. 6A. Times T0 through T6 from FIG. 6A are mapped onto a D-E hysteresis curve in FIG. 6B. In both FIGS. 6A, 6B, the reference symbol E represents a voltage for the domain, the reference symbol D represents polarization ("displacement") and the reference symbol I represents electric current flow.

It will be understood by those skilled in the art that a read interval followed by a write interval can be used to refresh data stored in a domain.

In all of the embodiments illustrated in FIGS. 1–6, the anisotropic layer can be formed by one or more of the following layer deposition types:

A) Metal clusters, including clusters of carbidic materials (e.g. tungsten carbide), with diameters smaller than 10 nm and separated from each other enough to achieve anisotropy.

B) Isolated metal columnar grains. Sputtered granular films, e.g. Pt—Al2O3.

C) Fullerenes, Cn (e.g., n=60).

D) Self-assembled nanoparticles.

E) Core/shell particle structure.

The number of domains switching at a time as the slider moves over the surface depends on the total contact area of the slider. Since the slider is moving in only one direction while writing, only the very end edge of the slider contact area determines the location of the remaining domain boundary.

While the cluster, grain, column or particle is continuous in a direction normal to the conductive layer, the individual cluster, grain, column or particle is separated from adjacent clusters, grains, columns or particles by a lower conductivity matrix. The lower conductivity matrix can comprise air, a grain boundary, an oxide or other lower conductivity feature depending on the type of islet selected. The macro lateral conductivity depends on the electron hopping/percolation probability from one islet to adjacent islets and also on mean islet size. The matrix in the top conductive layer defines the boundaries between domains in the memory layer. The size and shape of the platinum clusters is controllable by adjustment of the growth conditions such as film thickness, deposition rate and growth temperature.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the memory array while maintaining substantially the same functionality without departing from the scope of the present invention. In addition, although the preferred embodiment described herein is directed to a hysteretic memory material for use with binary data storage, it will be appreciated by those skilled in the art that the teachings of the present invention can be applied to storage of digital data with three or more levels, can be applied to various electric memory materials or to storage of continuous analog data in electrical hysteretic memory, without departing from the scope of the present invention.

What is claimed is:

1. A memory array, comprising:
   a memory layer that includes hysteretic domains with domain axes extending between first and second memory layer surfaces;
   a conductive layer on the first memory layer surface, the conductive layer having anisotropically increased electrical conductivity in a thickness direction; and
   a conductive probe having a contact area on the conductive layer, the conductive probe being movable to access a selected hysteretic domain.

2. The memory array of claim 1 wherein the memory layer comprises ferroelectric material.

3. The memory array of claim 1 wherein the memory layer comprises phase change material.

4. The memory array of claim 1 wherein the conductive layer has an anisotropic structure selected from the group: metal cluster, columnar grain, granular film, fullerene, nanoparticle and core/shell particle structures.

5. The memory array of claim 1 wherein the conductive layer comprises platinum clusters.

6. The memory array of claim 5 wherein the platinum clusters have a dimension on the order of 8 nanometers.

7. The memory array of claim 1 wherein the conductive layer comprises strontium oxide clusters.

8. The memory array of claim 1 wherein the conductive layer is free of masked features.

9. The memory array of claim 1 wherein the conductive layer comprises multiple islets of higher electrical conductivity isolated from one another by a matrix of lower electrical conductivity.

10. The memory array of claim 9 wherein the memory layer comprises an isotropic material, and the matrix define boundaries of the domains.

11. The memory array of claim 9 wherein the multiple islets have a mean islet diameter that does not exceed 8 nanometers.

12. The memory array of claim 9 wherein the contact area has a contact diameter that is at least 3 mean islet diameters.

13. The memory array of claim 1 further comprising a plurality of conductive probes having contact areas that are spaced apart from one another and movable together to access a plurality of selected hysteretic domains.

14. The memory array of claim 13 wherein the plurality of conductive probes are arranged in an array and the array is movable in an oscillatory pattern.

15. The memory array of claim 13 wherein the plurality of conductive probes are arranged in an array on a disc drive head and the memory layer and conductive layer are arranged on a disc.

16. A memory array, comprising:
   a memory layer that includes hysteretic domains with domain axes extending between first and second memory layer surfaces;
   conductive means on the first memory layer surface, the conductive means having anisotropically increased electrical conductivity in a thickness direction; and
   a conductive probe having a contact area on the conductive layer, the conductive probe being movable to access a selected hysteretic domain.

17. The memory array of claim 16 wherein the conductive layer comprises multiple islets of higher electrical conductivity isolated from one another by islet borders of lower electrical conductivity.

18. The memory array of claim 16 wherein the memory layer comprises an isotropic material, and the islet borders define boundaries of the domains.

19. The memory array of claim 16 wherein the multiple islets have a mean diameter that does not exceed 8 nanometers.

* * * * *